United States Patent Office 3,116,506
Patented Jan. 7, 1964

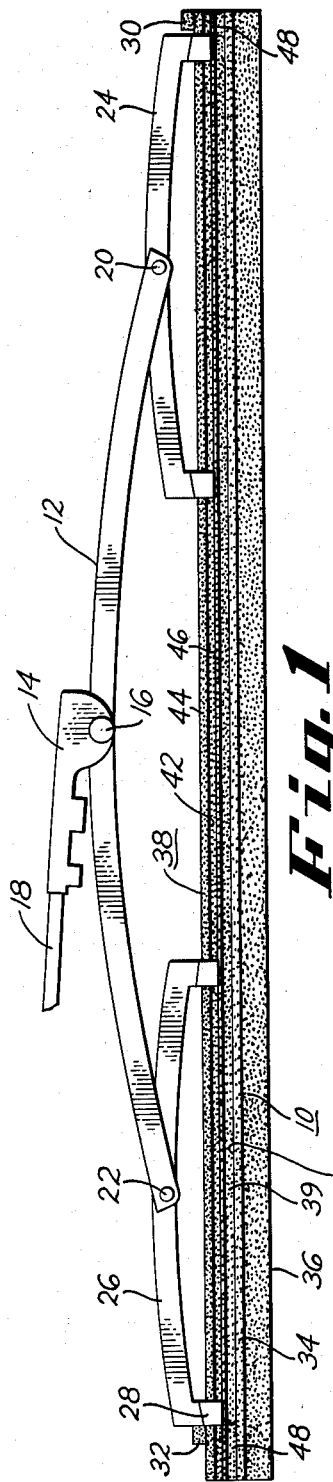
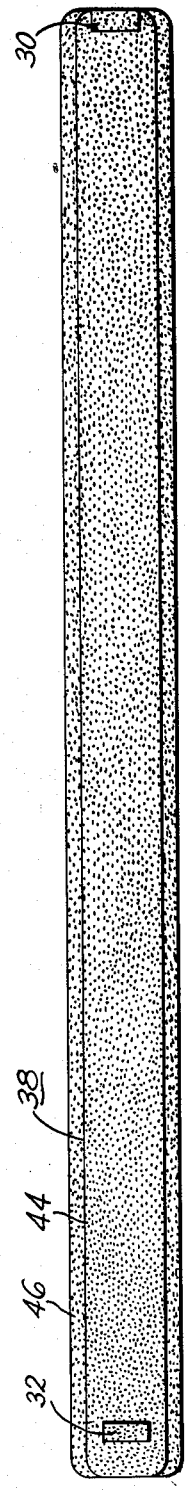
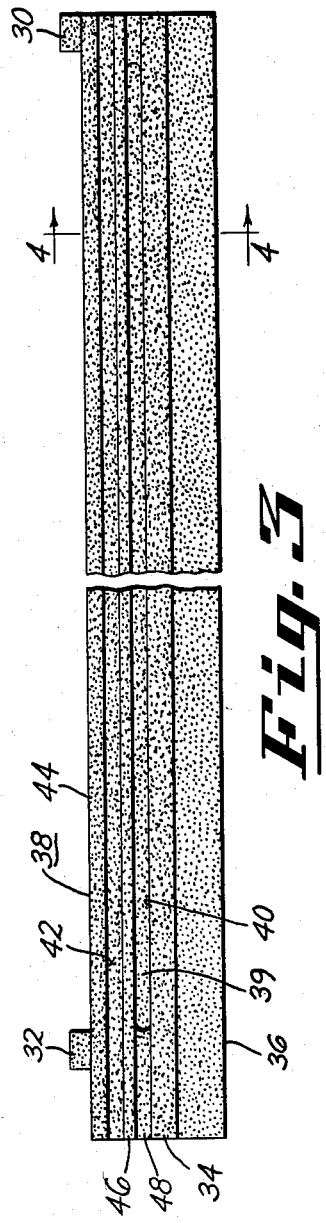

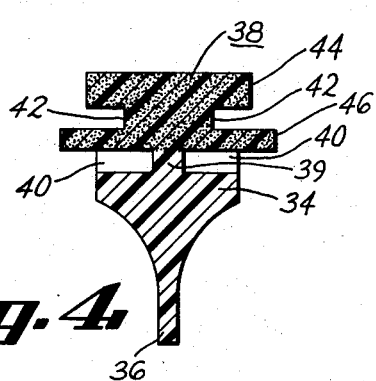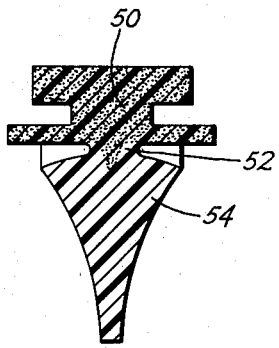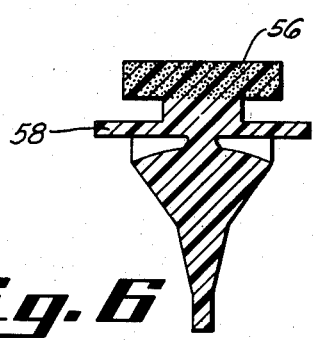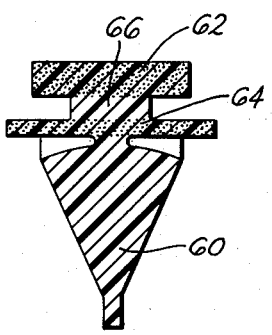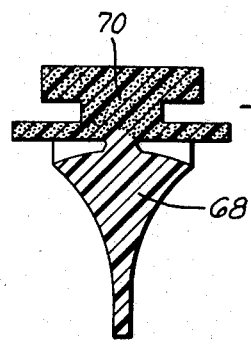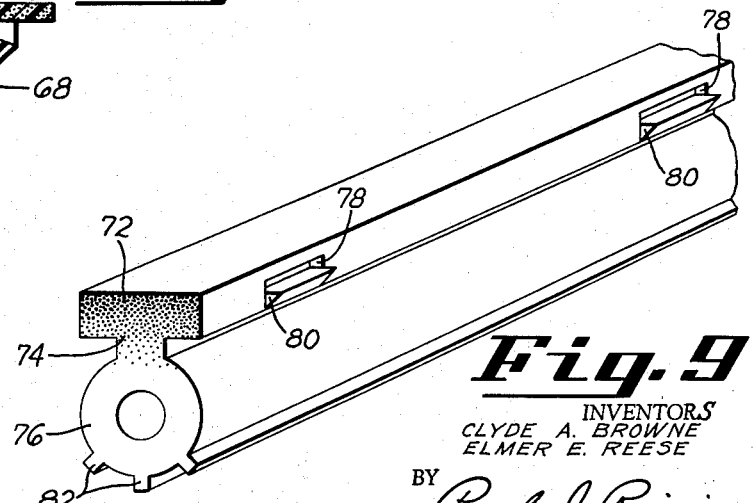

3,116,506
UNITARY SQUEEGEE AND WIPER BLADE
ASSEMBLY EMBODYING THE SAME
Clyde A. Browne, Brockport, and Elmer E. Reese,
Rochester, N.Y., assignors to General Motors Corporation, Detroit, Mich., a corporation of Delaware
Filed Jan. 16, 1961, Ser. No. 83,005
3 Claims. (Cl. 15—250.36)

This invention pertains to windshield wipers, and particularly to an improved squeegee unit for use in windshield wiper blade assemblies adapted to wipe substantially flat or curved surfaces. This application is a continuation-in-part of our copending application Serial No. 71,546, filed November 25, 1960.

Heretofore, commercially used windshield wiper blade assemblies adapted to wipe substantially flat and curved surfaces have embodied a squeegee unit comprising a flexible, resilient, elongate rubber or rubber-like squeegee and a flexible metal backing strip having a greater width than thickness such that when the backing strip is assembled with the squeegee the resultant squeegee unit is readily flexible in a plane normal to the surface to be wiped but substantially inflexible in a plane parallel to the surface to be wiped. The squeegee unit in prior commercial windshield wiper blade assemblies is carried by a pressure distributing linkage, or superstructure, comprising a plurality of pivotally interconnected and relatively movable levers, or yokes, having their free ends movably connected to the metal backing strip at longitudinally spaced apart points for applying wiper arm pressure and distributing the wiper arm pressure throughout the length of the squeegee unit to maintain the squeegee unit in contact with the surface to be wiped. While this type of windshield wiper blade assembly satisfactorily wipes curved as well as substantially flat, or planar, windshield surfaces it has several inherent disadvantages, namely noisy operation due to the metal to metal connections between the backing strip and the pressure distributing linkage; the likelihood of contact between the metal backing strip and the surface of the windshield under extreme drag conditions causing the surface of the windshield to become scratched; and the relatively high cost of manufacture due primarily to the labor involved in assembling the backing strip with the squeegee to form the squeegee unit.

The present invention comprehends a windshield wiper blade which obviates the disadvantages of prior commercial wiper blade assemblies alluded to hereinbefore, it being one of the objects of the invention to provide an elastomeric squeegee which, without requirement for a metal backing strip, has greater flexibility in a plane normal to the surface to be wiped than in a plane parallel thereto. More specifically, it is an object of the invention to provide a unitary squeegee of solid rubber or rubber-like material having longitudinally extending portions which impart the aforesaid optimum flexing characteristics. A further object is the provision of a wiper blade assembly comprising a unitary elastomeric squeegee and a linkage for distributing wiper arm pressure to longitudinally spaced apart points on said unitary squeegee, the combination of structural features of the assembly providing flexibility in a plane normal to the surface to be wiped and substantially non-flexibility in a plane parallel to the surface to be wiped.

Briefly, these objects are accomplished in accordance with the invention by a unitary elongated squeegee of solid rubber or other elastomeric material having a wiping portion and a back or retention portion for interconnecting the squeegee to a pressure distributing linkage, and having at least two longitudinally extending strata of different hardness, the wiping portion of the squeegee being substantially entirely of a relatively soft flexible stratum and the back or retention portion being formed at least in part by a relatively hard and therefore less flexible stratum. To attain optimum flexing characteristics the relatively hard stratum of the retention portion is of greater width than thickness. Hence, the squeegee is quite flexible in a plane normal to the surface to be wiped, and less flexible in a plane parallel to the surface to be wiped due to the elastomeric strata of differing hardness and the cross-sectional configuration thereof. The unitary squeegee can be interconnected by means of its retention portion with any desired type pressure distributing linkage, or superstructure, to form a wiper blade assembly; however, to attain the best flexing characteristics, particularly for the wiping of curved windshields, the superstructure should preferably comprise a plurality of interconnected yokes, or a combination of yokes and levers, having multiple spaced connections with the retention portion and being pivotal with respect to each other only in a plane generally perpendicular to the surface to be wiped such that the flexing characteristics of the superstructure complement those of the squeegee.

The above and further objects, features and advantages of the invention will appear more clearly from the following detailed description of preferred embodiments thereof made with reference to the accompanying drawings wherein:

FIGURE 1 is a longitudinal view, in elevation, of the windshield wiper blade assembly embodying the invention;

FIGURE 2 is a fragmentary plan view of the unitary squeegee shown in FIGURE 1;

FIGURE 3 is a fragmentary side elevational view of the squeegee shown in FIGURE 1;

FIGURE 4 is a view taken on the line 4—4 of FIGURE 3;

FIGURES 5 through 8, respectively, are sectional views similar to that of FIGURE 4 but showing other forms of unitary squeegees embodying the invention; and FIGURE 9 is a perspective view but with parts cut away, of still another embodiment of the invention.

With particular reference to FIGURE 1, the wiper blade assembly shown comprises a unitary rubber squeegee 10 hereinafter described in detail, and a pressure distributing linkage or superstructure which includes a channel-shaped primary yoke 12 having a substantially centrally arranged arm attaching clip 14 connected thereto by means of a pivot 16 permitting relative pivotal movement between the primary yoke and the clip 14 about an axis transverse to the longitudinal axis of the wiper blade assembly. The clip 14 detachably interconnects the wiper blade assembly with a conventional windshield wiper arm 18 for applying wiper arm pressure to the wiper blade assembly to thereby maintain the same in engagement with the surface to be wiped. Opposite ends of the channel-shaped primary yoke 12 are pivotally connected by transversely arranged pins 20 and 22 to the channel-shaped secondary yokes 24 and 26, respectively, the central portions of the secondary yokes which are adjacent the pivot pins 20 and 22 being disposed between the side walls of the channel-shaped primary yoke in nested relation. Hence, the secondary yokes are free to pivot in a plane generally perpendicular to the surface to be wiped but are precluded from any substantial pivotal movement in a plane parallel to the surface to be wiped. The ends of each of the secondary yokes are formed with pairs of claws, as shown at 28, adapted to straddle the retention portion of the unitary squeegee 10 and apply wiper arm pressure at four substantially equally spaced points along the length of the squeegee. An especially advantageous claw structure is that covered by United States patent application Serial No. 83,004 filed concurrently herewith in the names of Salvatore L. Latone and Elmer E. Reese, assigned to the assignee of the present invention. The claws of the secondary yokes have some lost or sliding motion with the squeegee and any suitable means, such as abutments 30 and 32 at the ends of the squeegee can be employed to assure that the squeegee will not slide out of the linkage during operation; however, a particularly suitable means for maintaining the squeegee and linkage in assembled relationship is that covered by United States patent application Serial No. 82,810 filed concurrently herewith in the name of Salvatore L. Latone, assigned to the assignee of the present invention.

Referring now to FIGURES 2 through 4, and particularly to FIGURE 4, the squeegee which is shown comprises a flexible, resilient, elongate unitary body of rubber having a relatively narrow tapered wiping portion 34, the lower part of which forms a wiping lip 36, this wiping portion being connected to a relatively wide retention or backing portion 38 by a thin neck portion 39 formed by two oppositely disposed flexure grooves 40. The retention portion has a pair of coplanar grooves 42 extending throughout the length on opposite sides thereof thereby providing the opposite sides of the retention portion with integral upper and lower longitudinal outwardly extending flanges 44 and 46 respectively. The claws 28 on the ends of the secondary yokes straddle the upper flanges 44 and have inwardly bent portions disposed in the grooves 42, the upper inner surface of each claw pair being engageable with the upper surface of the squeegee to apply pressure thereto. It is desirable that the flexure grooves terminate short of the ends of the squeegee to form reinforced ends 48, and the lower flanges 46 of the retention portion are made sufficiently wide to preclude engagement between the claws 28 of the superstructure and the surface being wiped. The thin section formed by the flexure grooves 40 enables the wiping portion 34 to tilt, or lay over, during movement of the wiper blades so that the wiping lip 36 will assume the proper squeegeeing attitude relative to the surface being wiped. Lay over or tilting movement of the wiping portion is, of course, limited by engagement of the wiping portion with the lower surfaces of the flanges 46.

In accordance with the invention, the retention portion 38 of the squeegee is of a relatively hard rubber and the wiping portion 34 is of a softer and therefore more flexible rubber. This can best be seen by reference to FIGURE 4 wherein the greater hardness of the retention portion has been depicted by darker shading. It will be noted that in this preferred embodiment, the softer more flexible rubber of the wiping portion reaches to about the top of the thin section 39. In practice, there may be a slight diffusion or penetration of the soft rubber into the hard, and vice versa, at the junction therebetween. In the particular embodiment shown in FIGURES 1 through 4 the hard rubber strata of the retention portion has a durometer hardness of about 90 on the Shore D scale and the durometer hardness of the wiping portion is about 58 on the Shore A scale.

It will be noted that the width of the relatively hard stratum which forms the retention portion is appreciably greater than the thickness thereof. Particularly by virtue of this fact the unitary squeegee has greater flexibility in a plane normal to the surface to be wiped than in a plane parallel to this surface even though the over-all thickness of the squeegee from top to bottom thereof is greater than its width.

The squeegee can be manufactured by any of various known procedures and from known rubber recipes; however the presently preferred method of manufacture, including exemplary specific rubber recipes for the hard and soft strata, is disclosed in United States patent application Serial No. 83,007 filed concurrently herewith in the name of Thomas O. Mathues and assigned to the assignee of the present invention. Briefly the method comprehended by that patent application includes the steps of extruding or cutting from milled sheets various rubber stocks each compounded to provide a different degree of hardness, into sections approximating the shape and quantity desired. These sections are laid up in an open mold in the proper order to provide the required laminated structure and the mold is then closed whereby the sections are compression molded to the desired squeegee shape and then cured, the sections or laminae bonding together during the operation to form a unitary structure having strata of differing hardness. It is apparent that if a single curing operation is used, all sections should be formulated to cure in the same period of time in accordance with practice known in the art. It is also possible, as is well known in the art, to partially precure certain sections and then complete the cure of these sections simultaneously with the cure of other sections in the final curing step.

FIGURES 5 through 8 show cross-sectional views of other unitary squeegees embodying the invention. The squeegee shown by FIGURE 5 differs from that of FIGURE 4 in that the hard stratum 50 of the retention portion which in this embodiment has a hardness of 85 on the Shore A scale, extends through the center of the thin section 52 and penetrates slightly into the wiping portion 54 which is formed of rubber with a 55 Shore A hardness. Also in the FIGURE 5 embodiment the wiping portion has uniformly curved side surfaces from top to bottom thereof, and flexure grooves have top and bottom surfaces which are at an angle, or arcuate, rather than parallel to each other as in FIGURE 4.

In the squeegee of FIGURE 6 the hard stratum (90 Shore A) forms only the upper part 56 of the retention portion, the lower flanges 58 along with the thin section and wiping portion being of softer rubber (60 Shore A). In this embodiment the wiping portion instead of having curved side surfaces has a plurality of straight side surfaces which are angularly oriented relative to each other as shown.

In the squeegee of FIGURE 7, the soft (58 Shore A) wiping portion 60 is substantially triangular in configuration, and the retention portion is formed with hard (90 Shore A) upper and lower strata 62 and 64, there being a soft (58 Shore A) strata 66 therebetween.

In the FIGURE 8 embodiment the soft (65 Shore A) stratum of the wiping portion 68 extends into the center of the hard (85 Shore D) retention portion 70.

The embodiment shown in FIGURE 9 differs from the others in that the retention portion is formed by a hard stratum which has a hardness of 95 Shore D at the top surface 72 thereof and which gradually diminishes in hardness to 85 Shore A at the bottom 74 thereof, the wiping portion 76 having a hardness of about 45 to 50 on the Shore A scale. It will be noted that this FIGURE 9 embodiment also has an external shape which differs from those of the other embodiments illustrated. The retention portion is of relatively simple rectangular cross-section and has spaced opposed slots 78 in its side walls for interconnection with its superstructure. Outwardly extending lugs 80 are formed on the side walls just below the slots to better assure against contact of the superstructure jaws with the windshield. The wiping portion is in the form of a tube or cylinder having a plurality of longitudinally extending wiping ridges or lips 82 extending outwardly from the bottom surface thereof.

When the unitary squeezee of this invention is assembled with pressure distributing linkage such as shown in FIGURE 1, the resultant wiper blade assembly is readily flexible in a plane normal to the surface to be wiped, and substantially inflexible in a plane parallel thereto. The substantial rigidity of the unitary squeegee in the plane parallel to the surface to be wiped is effected both by the structure of the squeegee itself, as described above, and by the interconnection of the squeegee with the pressure distributing linkage which is substantially rigid in the plane parallel to the surface to be wiped due to the arrangement of pivots and the nesting relation of the yokes. It will be seen that wiper arm pressure is applied to a plurality of spaced apart points throughout the length of the unitary squeegee, and wiper arm pressure is distributed in accordance with the geometry of the superstructure. The resultant wiper blade assembly readily conforms to curved surfaces, provides appreciably quieter operation than do present commercial wiper blade assemblies since there are no sliding metal to metal connections between the superstructure and the squeegee unit, and furnishes increased assurance against scratching of the glass windshield surface. In addition, substantial manufacturing economies can be realized since the conventional metal strip is eliminated thereby resulting in material and labor savings.

While the embodiments of the invention as herein disclosed constitute preferred forms, it is to be understood that other forms might be adopted. For example, various other external squeegee shapes may be employed. Further, elastomers other than rubber, including any of the well known synthetic elastomers such as butadiene-styrene, butadiene-acrylonitrile, polychloroprene, etc., may be used if desired.

What is claimed is as follows:

1. A vehicle windshield wiper squeegee comprising a flexible, unitary, elongate body of solid elastomeric material having a relatively narrow longitudinally extending wiping portion along the lower side thereof, and a relatively wide longitudinally extending retention portion along the upper side thereof joined to said wiping portion by a thin neck portion, said body having longitudinally extending strata of different hardness, said wiping portion and neck portion being formed at least in part by a soft stratum and said retention portion being formed at least in part by hard stratum which is of greater width than thickness, said soft stratum extending through the neck portion into said retention portion.

2. A vehicle windshield wiper squeegee comprising a flexible, unitary, elongate body of solid elastomeric material having a relatively narrow longitudinally extending wiping portion along the lower side thereof, and a relatively wide longitudinally extending retention portion along the upper side thereof joined to said wiping portion by a thin neck portion, said body having longitudinally extending strata of different hardness, said wiping portion and neck portion being formed at least in part by a soft stratum and said retention portion being formed at least in part by hard stratum which is of greater width than thickness, said hard stratum extending into said neck portion.

3. A vehicle windshield wiper squeegee comprising a flexible, unitary, elongate body of solid elastomeric material having a relatively narrow longitudinally extending wiping portion along the lower edge thereof and a relatively wide longitudinally extending retention portion along the upper side thereof joined to said wiper portion by a thin neck portion, the opposed side walls of said retention portion having longitudinally extending grooves for attachment to said retention portion of supporting linkage, said body having longitudinally extending strata of different hardness, said wiping portion and said neck portion being formed substantially entirely by a soft stratum and said retention portion being formed at least in part by a hard stratum having greater width than thickness.

References Cited in the file of this patent

UNITED STATES PATENTS

| | | |
|---|---|---|
| 1,825,376 | Vaughn | Sept. 29, 1931 |
| 2,099,030 | Morrison | Nov. 16, 1937 |
| 2,741,791 | Scinta | Apr. 17, 1956 |
| 2,760,220 | Deibel | Aug. 28, 1956 |